US012640901B2

(12) United States Patent
Saxena et al.

(10) Patent No.: US 12,640,901 B2
(45) Date of Patent: May 26, 2026

(54) SERIALIZATION CIRCUITRY HAVING AN INTEGRATED BUFFER FOR A SERIALIZER/DERSERILIZER COMMUNICATION SYSTEM

(71) Applicant: Advanced Micro Devices, Inc., Santa Clara, CA (US)

(72) Inventors: Priyadarshi Saxena, Bangalore (IN); Krishnaiah Gummidipudi, Bangalore (IN); Prasant Kumar Vallur, Hyderabad (IN); Srikanth Reddy Gruddanti, Bangalore (IN); Krishna Reddy Mudimela Venkata, Bangalore (IN); David Hugh McIntyre, Redwood City, CA (US); Ramon A. Mangaser, Arlington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 22 days.

(21) Appl. No.: 18/599,058

(22) Filed: Mar. 7, 2024

(65) Prior Publication Data

US 2025/0286696 A1      Sep. 11, 2025

(51) Int. Cl.
*H04L 7/00* (2006.01)
*H04L 5/02* (2006.01)

(52) U.S. Cl.
CPC ............ *H04L 7/0087* (2013.01); *H04L 5/023* (2013.01)

(58) Field of Classification Search
CPC .............................. H04L 7/0087; H04L 5/023
See application file for complete search history.

(56) References Cited

U.S. PATENT DOCUMENTS

| | | | | |
|---|---|---|---|---|
| 7,539,789 B1 * | 5/2009 | Ogden | .................... | G06F 5/065 |
| | | | | 710/36 |
| 8,331,427 B2 * | 12/2012 | Agrawal | ............... | H04L 7/0331 |
| | | | | 375/355 |
| 2011/0194651 A1 * | 8/2011 | Hayasaka | ............... | H04L 7/042 |
| | | | | 375/340 |
| 2021/0281387 A1 * | 9/2021 | Kettering | .............. | H04L 7/0087 |
| 2023/0420017 A1 * | 12/2023 | Kolar | .................. | G11C 11/4096 |

* cited by examiner

*Primary Examiner* — Dac V Ha
(74) *Attorney, Agent, or Firm* — Patterson + Sheridan, LLP

(57) ABSTRACT

Transmitter circuitry receives a data signal and outputs a serial data signal. The transmitter circuitry includes serializer circuitry. The serializer circuitry includes data input circuitry and data serializer circuitry. The data input circuitry receives and outputs a first data signal based on a write pointer signal having a first value of values and a first clock signal. The data serializer circuitry configured to serialize the first data signal to generate a serial signal based on a read pointer signal having a second value of the values and a second clock signal. The first value differs from the second value.

20 Claims, 4 Drawing Sheets

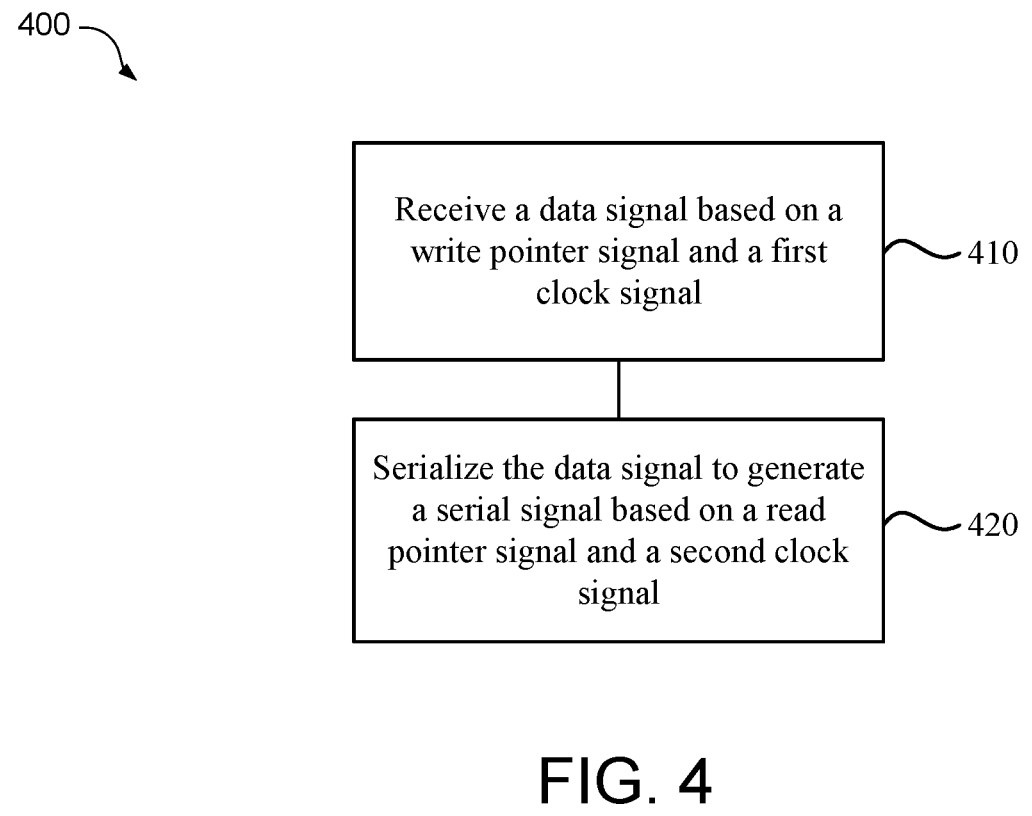

400

Receive a data signal based on a write pointer signal and a first clock signal    ～ 410

Serialize the data signal to generate a serial signal based on a read pointer signal and a second clock signal    ～ 420

FIG. 4

SERIALIZATION CIRCUITRY HAVING AN INTEGRATED BUFFER FOR A SERIALIZER/DERSERILIZER COMMUNICATION SYSTEM

TECHNICAL FIELD

Examples of the present disclosure generally relate to serializer circuitry of a communication system having a reduced latency and input signal to output signal frequency ratio.

BACKGROUND

Integrated circuit (IC) devices are interconnected via communication interconnects of communication systems. The communication interconnects may be a serializer/deserializer (SerDes), and is used to transmit and receive data signals between the IC devices. In a SerDes communication interconnect, a transmitter receives parallel data and outputs serial data. The received data (e.g., input data) is received in a low frequency domain and transferred to a high frequency domain before output as the serial data. In one example, the frequency ratio between the received data and the output data is 1:4. Further, the serializer of the SerDes communication interconnect has a latency that delays when the serial data is output from when the input data is received. The latency negatively impacts the performance of the communication interconnect, and increases as the frequency ratio increases. Accordingly, to support higher frequency ratios of higher speed communication interconnects, a serializer having lower latency and signal frequency ration for a SerDes communication interconnect is needed.

SUMMARY

In one example, serializer circuitry includes data input circuitry and data serializer circuitry. The data input circuitry receives and outputs a first data signal based on a write pointer signal having a first value of values and a first clock signal. The data serializer circuitry serializes the first data signal to generate a serial signal based on a read pointer signal having a second value of the values and a second clock signal. The first value differs from the second value.

In one example, a communication system includes transmitter circuitry and receiver circuitry. The transmitter circuitry receives a data signal and outputs a serial data signal. The transmitter circuitry includes serializer circuitry. The serializer circuitry includes data input circuitry and data serializer circuitry. The data input circuitry receives and outputs a first data signal based on a write pointer signal having a first value of values and a first clock signal. The data serializer circuitry configured to serialize the first data signal to generate a serial signal based on a read pointer signal having a second value of the values and a second clock signal. The first value differs from the second value. The receiver circuitry receives the serial data signal from the transmitter circuitry.

In one example, a method includes receives, at serializer circuitry, a data signal based on a write pointer signal having a first value of values and a first clock signal. The method further includes serializing, via the serializer circuitry, the data signal to generate a serial signal based on a read pointer signal having a second value of the values and a second clock signal. The first value differs from the second value.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 illustrates a flowchart of a method of operating serializer circuitry.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
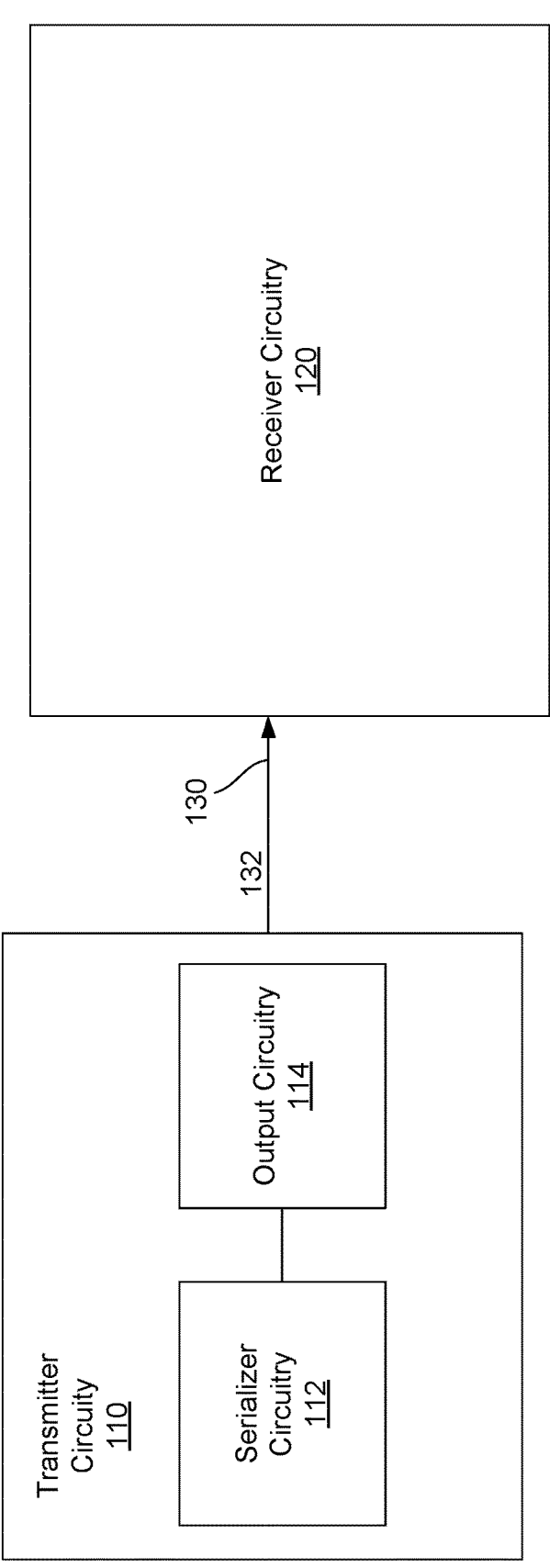
FIG. 1 illustrates a block diagram of a communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Integrated circuit (IC) devices are interconnected via a communication interconnect of a communication system. The communication system may be a serializer/deserializer (SerDes), and is used to transmit and receive data signals between the IC devices. In a transmitter of a SerDes communication system, parallel data is received (e.g., input data) at a first frequency. The data is converted to serial data and output a second frequency. The second frequency is greater than the first frequency. In one example, the input data is received in a low frequency domain and transferred to a high frequency domain before being output as the serial data. In one example, the frequency ratio between the received data and the output data is 1:4.

In a SerDes communication system, a first IC device includes serializer circuitry and output circuitry that outputs the serial data to a deserializer circuitry within receiver circuitry of a second IC device. A first-in-first-out (FIFO) buffer is coupled to the input to the serializer circuitry. The FIFO buffer operates based on a first clock signal and a write pointer signal. The serializer circuitry operates based on a second clock signal and a read pointer signal. The frequency of the first clock signal is less than that of the second clock signal. In one example, the ratio of the frequency of the first clock signal to the frequency of the second clock signal is 1:4. However, the ratio may be greater than or less than 1:4.

Accordingly, the serializer functions in higher frequency domain than the FIFO buffer. Further, in a typical SerDes communication system, the write pointer signal is synchronized with the read pointer signal such that the stage of the FIFO buffer is synchronized with the stage of the serializer circuitry.

The SerDes communication system has a latency that is associated with when data received by the FIFO buffer coupled to the serializer circuitry of a first IC device is output and received by the receiver circuitry of a second IC device. The latency of the serializer circuitry contributes to the overall latency of SerDes communication system, and the latency of the corresponding physical interface (PHY) of the communication system. For example, the latency of a PHY is 3.5 clock cycles, and the latency of the serializer circuitry is 1.25 clock cycles. Further, the latency increases as the clock signal ratio increases. Accordingly, by reducing the latency of the serializer circuitry and/or the clock signal ratio, the latency of the PHY is reduced.

In the following, serializer circuitry for a SerDes communication system having a reduced latency is described. The serializer circuitry described in the following combines clock domain buffer circuitry with serialization circuitry into a single stage. The serializer circuitry described in the following uses an improved address generation scheme where the stages of a read pointer signal and a write pointer signal differ from each other. For example, the read pointer signal and the write pointer signal reset to different values (e.g., states or stages). The serializer circuitry described herein performs a read capture on a single edge of a clock signal of the serializer circuitry. When the read pointer signal begins to switch between values, a first bit is output from the serializer circuitry as the read pointer signal is a state ahead of the write pointer signal. Further, the remaining bits of the data signal are stored an output at subsequent edges of the clock signal of the serializer circuitry. In one example, the four bits of a data signal are read into the read clock domain in a single edge of a clock signal of the serializer circuitry. Accordingly, the latency of the serializer circuitry is reduced, improving the performance of the SerDes communication system, and allowing the SerDes communication system to operate at higher clock signal ratios.

FIG. 1 illustrates a block diagram of a communication system 100, according to one or more examples. The communication system 100 includes transmitter circuitry 110 and receiver circuitry 120 communicatively connected to each other via channel 130. In one example, the transmitter circuitry 110 is part of a transceiver device and/or the receiver circuitry 120 is part of a transceiver device. In one or more examples, the transmitter circuitry 110 and the receiver circuitry 120 are part of a serializer-deserializer (SerDes). The communication system 100 is included within one or more integrated circuit (IC) devices. For example, the transmitter circuitry 110 is included within a first IC device and the receiver circuitry 120 is included in a second IC device. In another example, at least a portion of the transmitter circuitry 110 and at least a portion of the receiver circuitry 120 are included within a common IC device. In one example, an IC device may be a field programmable gate array (FPGA), or an application specific IC (ASIC), among others.

The transmitter circuitry 110 communicates (e.g., transmits) a data signal 132 to the receiver circuitry 120 via the channel 130. The data signal 132 may be a serial data signal. The data signal 132 includes one or more symbols. The transmitter circuitry 110 converts each symbol into a voltage which is driven onto the channel 130 and received by the receiver circuitry 120. The transmitter circuitry 110 uses one or more modulation schemes (e.g., a binary non-return-to-zero modulation scheme or a multi-level digital baseband modulation scheme, among others). Further, the transmitter circuitry 110 drives the data signal 132 based on a transmitter clock signal. The transmitter clock signal may be generated locally within the transmitter by clock generation circuitry (e.g., phase-locked loop (PLL) circuitry).

In one or more examples, the transmitter circuitry 110 includes serializer circuitry 112 and output circuitry 114. The serializer circuitry 112 receives data in parallel, and converts the parallel data to serial data. The serial data is output by the output circuitry 114 as the data signal 132, e.g., a serial data signal. The transmitter circuitry 110 may include other circuit elements (e.g., signal processing circuitry) not illustrated in FIG. 1.

The receiver circuitry 120 receives the data signal 132 from the transmitter circuitry 110 via the channel 130. In one or more examples, the receiver circuitry 120 includes clock and data recovery (CDR) circuitry that generates a clock signal that is based on the transmitter rate of the data signal 132, and accordingly, the clock signal of the transmitter circuitry 110. In one or more examples, the CDR circuitry adjusts the phase of the clock signal based on the data signal 132. In one example, the CDR circuitry is part of equalization circuitry that mitigates inter-symbol interference (ISI) via an equalization process. The equalization process includes restoring the amplitude distortions that occur within the data signal transmitted by the transmitter circuitry 110 via the channel 130. In one example, the clock signal generated by the CDR circuitry may be referred to as a launch clock signal.

The receiver circuitry 120 further includes data path circuitry that decodes and processes the data signal 132 based on the launch clock signal. Additionally, or alternatively, the data path circuitry functions as a pass through, passing the data signal 132 in a substantially unmodified state. The data path circuitry includes one or more data path circuitries. The data path circuitries may be in parallel with each other. In one example, the data path circuitry includes deserializer circuitry that generates parallel data signals from the data signal 132.

In one example, transmitter circuitry 110 and the receiver circuitry 120 form at least a portion of physical interface (PHY) circuitry of the communication system 100.

Figure 2:
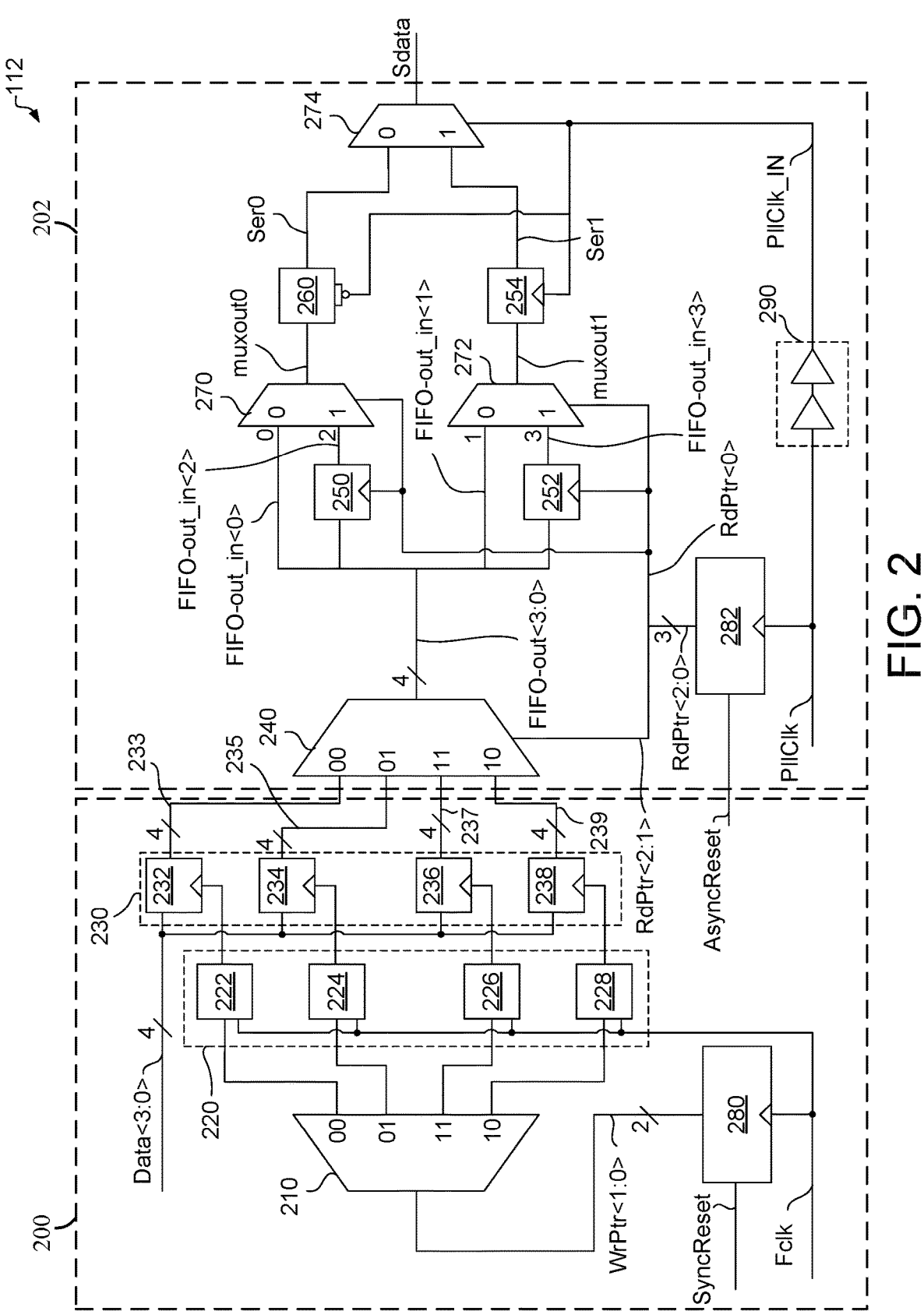
FIG. 2 illustrates a block diagram of serializer circuitry.

FIG. 2 is a block diagram of the serializer circuitry 112. The serializer circuitry 112 functions as a buffer and a serializer. For example, the serializer circuitry 112 buffers the incoming data signal, e.g., Data<3:0>, and serializes the data signal Data<3:0> as the output signal Sdata (e.g., output serial data signal).

The serializer circuitry 112 includes data read circuitry 200 and data serializer circuitry 202. The data read circuitry 200 receives and outputs input data signals (e.g., Data<3:0>) based on a write pointer signal (e.g., the write pointer signal WrPtr<1:0>) and a clock signal (e.g., the clock signal Fclk). The data read circuitry 200 includes demultiplexer 210, latch circuitries 220, buffer circuitries 230, and counter circuitry 280. The data serializer circuitry 202 to output a serial signal generated by serializing a data signal (e.g., Data<3:0>) received from the data read circuitry 200 based on a read pointer signal (e.g., RdPtr<2:0>) having a value different from that of the write pointer signal and a clock signal (e.g., the clock signal PllClk). The data serializer circuitry 202 includes latch circuitry 260, buffer circuitries 250, 252 and 254, multiplexers 240 and 270-274, and counter circuitry 282.

An input of the demultiplexer 210 is coupled to an output of the counter circuitry 280. The counter circuitry 280 outputs the write pointer signal WrPtr<1:0> to the demultiplexer 210. In one example, the counter circuitry 280 is a two bit counter. In other examples, the counter circuitry 280 is more than a two bit counter. The demultiplexer 210 receives the write pointer signal WrPtr<1:0> via the input. The counter circuitry 280 receives the signal SyncReset and the clock signal Fclk, and generates the write pointer signal WrPtr<1:0> based on the signal SyncReset and the clock signal Fclk. The write pointer signal WrPtr<1:0> is a two bit signal. In one example, the write pointer signal WrPtr<1:0> has a value of 00, 01, 11, or 10. In one example, the counter circuitry 280 resets the value of the write pointer signal WrPtr<1:0> to 00 based on the activation of the signal SyncReset. The value of the write pointer signal WrPtr<1:0> is incremented (e.g., cycled or shifted) through the values (e.g., states) 00, 01, 11, and 10 based on a rising or falling edge of the clock signal Fclk by the counter circuitry 280.

The latch circuitries 220 include latch circuitries 222-228. Each of the latch circuitries 222-228 have an input coupled to a respective output of the demultiplexer 210. As illustrated, the demultiplexer 210 is a 1:4 demultiplexer. In other examples, the demultiplexer 210 may have other input to output ratios. Further, each of the latch circuitries 222-228 receives a respective signal from the demultiplexer 210 via a first input and the clock signal Fclk via a second input. The clock signal Fclk controls the latch circuitries 222-228 to capture and/or output a signal received from the demultiplexer 210.

The demultiplexer 210 outputs a signal having a value of 00 to the latch circuitry 222, a signal having a value of 01 to the latch circuitry 224, a signal having a value of 11 to the latch circuitry 226, and a signal having a value of 10 to the latch circuitry 228.

The buffer circuitries 230 include buffer circuitries 232-238. The output of the latch circuitry 222 is coupled to an input of the buffer circuitry 232. The output of the latch circuitry 224 is coupled to an input of the buffer circuitry 234. The output of the latch circuitry 226 is coupled to an input of the buffer circuitry 236. The output of the latch circuitry 228 is coupled to an input of the buffer circuitry 238. Further, an input of each buffer circuitry 232-238 receives the data signal Data<3:0> (e.g., input parallel data signal).

The signal output by each of the latch circuitries 222-228 controls a respective buffer 232-238 to output a respective data signal 233-239. For example, the buffer circuitry 232 captures a first data signal Data<3:0> (e.g., d0<3:0>) based on a rising (or falling) edge of the output of the latch circuitry 222. Further, the buffer circuitry 232 outputs the first data signal Data<3:0> (e.g., d0<3:0>) based on a rising (or falling) edge of the output of the latch circuitry 222. The buffer circuitry 234 captures a second data signal Data<3:0> (e.g., d1<3:0>) based on a rising (or falling) edge of the output of the latch circuitry 224. The buffer circuitry 234 outputs the second data Data<3:0> (e.g., d1<3:0>) based on a rising (or falling) edge of the output of the latch circuitry 224. The buffer circuitry 236 captures a third data signal Data<3:0> (e.g., d2<3:0>) based on a rising (or falling) edge of the output of the latch circuitry 226. The buffer circuitry 236 outputs the third data signal Data<3:0> (e.g., d2<3:0>) based on a rising (or falling) edge of the output of the latch circuitry 226. The buffer circuitry 238 captures a fourth data signal Data<3:0> (e.g., d3<3:0>) based on a rising (or falling) edge of the output of the latch circuitry 228. The buffer circuitry 238 outputs the fourth data signal Data<3:0> (e.g., d3<3:0>) based on a rising (or falling) edge of the output of the latch circuitry 228.

An output of each buffer circuitry 232-238 is coupled to a respective input of the multiplexer 240. For example, the buffer circuitry 232 is coupled to a first input of the multiplexer 240, the buffer circuitry 234 is coupled to a second input of the multiplexer 240, the buffer circuitry 236 is coupled to a third input of the multiplexer 240, and the buffer circuitry 238 is coupled to a fourth input of the multiplexer 240.

The multiplexer 240 receives a first two bits (the most significant bits (MSB)) of the read pointer signal RdPtr<2:0> (e.g., the read pointer signal RdPtr<2:1>) from an output of the counter circuitry 282. The read pointer signal RdPtr<2:1> functions as the control signal for the multiplexer 240. For example, the multiplexer 240 selects and outputs one of the signals 233-239 based on the value of the read pointer signal RdPtr<2:1>.

The read pointer signal RdPtr<2:1> includes two bits of the read pointer signal RdPtr<2:0>. Based on the read pointer signal RdPtr<2:1> having a value of 00, the multiplexer 240 selects and outputs the signal 233, based on the read pointer signal RdPtr<2:1> having a value of 01, the multiplexer 240 selects and outputs the signal 235, based on the read pointer signal RdPtr<2:1> having a value of 11, the multiplexer 240 selects and outputs the signal 237, and based on the read pointer signal RdPtr<2:1> having a value of 10, the multiplexer 240 selects and outputs the signal 239.

The counter circuitry 282 receives the signal AsyncReset and the clock signal PllClk. The counter circuitry 282 generates the read pointer signal RdPtr<2:0> based on the signal AsyncReset and the clock signal PllClk. In one example, the read pointer signal RdPtr<2:0> has a value of 01, 11, 10, and 00. The value of 01 corresponds to a reset state. The counter circuitry 282 increments (e.g., cycles or shifts) the MSBs of the read pointer signal RdPtr<2:0> (e.g., the signal RdPtr<2:1>) through the values (e.g., states) of 01, 11, 10, and 00 based on rising edges (or falling edges) of the clock signal PllClk. The counter circuitry 282 further alternates the least significant bit (LSB) of the read pointer signal RdPtr<2:0> (e.g., the signal RdPtr<0>) between a value of zero and one based on rising edges (or falling edges) of the clock signal PllClk.

The output of the multiplexer 240 is coupled to a first input of the multiplexer 270, an input of the buffer circuitry 250, a first input of the multiplexer 272, and an input of the buffer circuitry 252. In one example, the multiplexer 240 outputs a four bit signal. In such an example, a first bit (e.g., bit 0) of the four bit signal is received at the first input of the multiplexer 270, a second bit (e.g., bit 1) of the four bit signal is received at the first input of the multiplexer 272, a third bit (e.g., bit 2) of the four bit signal is received at the input of the buffer circuitry 250, and a fourth bit (e.g., bit 3) of the four bit signal is received at the input of the buffer circuitry 252.

The first bit (e.g., bit 0) is included within the signal FIFO-out_in<0>, the second bit (e.g., bit 1) is included within the signal FIFO-out_in<1>, the third bit (e.g., bit 2) is included within the signal FIFO-out_in<2>, and the fourth bit (e.g., bit 3) is included within the signal FIFO-out_in<3>.

The buffer circuitries 250 and 252, and the multiplexers 270 and 272 receive the read pointer signal RdPtr<0>. The read pointer signal RdPtr<0> functions as a control signal (e.g., clock signal), to control the capture of a respective signal (e.g., bit of the output of the multiplexer 240) by the buffer circuitries 250 and 252. For example, the buffer circuitry 250 captures and outputs a third bit (e.g., bit 2) of the output of the multiplexer 240 based on rising edges (or falling edges) of the read pointer signal RdPtr<0>. The buffer circuitry 252 captures and outputs a fourth bit (e.g., bit 3) of the output of the multiplexer 240 based on rising edges (or falling edges) of the read pointer signal RdPtr<0>.

The multiplexer 270 selects and outputs one of the signals FIFO-out_in<0> and FIFO-out_in<2> based on the value of the read pointer signal RdPtr<0>. For example, the multiplexer 270 selects and outputs the signal FIFO-out_in<0> as the signal muxout0 based on the read pointer signal RdPtr<0> having a value of 0. The multiplexer 270 selects and outputs the signal FIFO-out_in<2> as the signal muxout0 based on the read pointer signal RdPtr<0> having a value of 1.

The multiplexer 272 selects and outputs one of the signals FIFO-out_in<1> and FIFO-out_in<3> based on the value of the read pointer signal RdPtr<0>. For example, the multiplexer 272 selects and outputs the signal FIFO-out_in<1> as the signal muxout1 based on the read pointer signal RdPtr<0> having a value of 0. The multiplexer 272 selects and outputs the signal FIFO-out_in<3> as the signal muxout1 based on the read pointer signal RdPtr<0> having a value of 1.

The output of the multiplexer 270 is coupled to an input of the latch circuitry 260. Further, the latch circuitry 260 receives the inverted clock signal PllClk_IN. The inverted clock signal Pllclk_IN is generated from the clock signal PllClk by the inverter circuitry 290. Based on rising edges (or falling edges) of the inverted clock signal PllClk_IN, the latch circuitry 260 latches and outputs the signal muxout0 as the signal Ser0 (e.g., the serialization signal).

The output of the multiplexer 272 is coupled to an input of the buffer circuitry 254. Further, the buffer circuitry 254 receives the inverted clock signal PllClk_IN. Based on rising edges (or falling edges) of the inverted clock signal PllClk_IN, the buffer circuitry 254 captures and outputs the signal muxout1 as the signal Ser1.

The multiplexer 274 receives the inverted clock signal PllClk_IN. The inverted clock signal PllClk_IN functions as a control signal for the multiplexer 274. Further, a first input of the multiplexer 274 is coupled to an output of the latch circuitry 260, and receives the signal Ser0 from the latch circuitry 260. A second input of the multiplexer 274 is coupled to an output of the buffer circuitry 254, and receives the signal Ser1 from the buffer circuitry 254.

In one example, the multiplexer 274 selects and outputs one of the signals Ser0 and Ser1 based on the value of the inverted clock signal PllClk_IN. For example, the multiplexer 274 selects and outputs the signal Ser0 as the output signal Sdata based on the inverted cock signal PllClk_IN having a value of 0. The multiplexer 274 selects and outputs the signal Ser1 as the output signal Sdata based on the inverted cock signal PllClk_IN having a value of 1.

Figure 3:
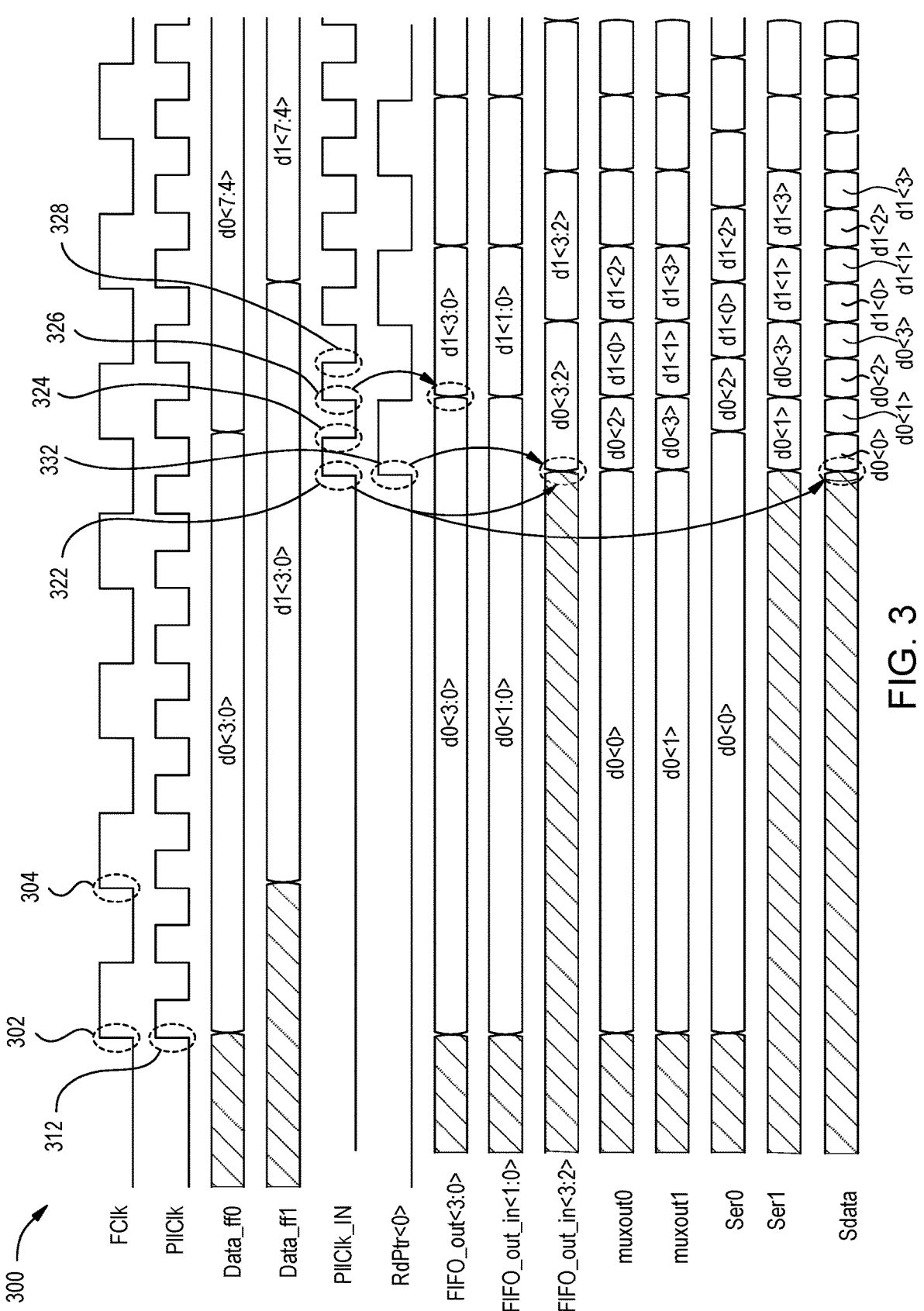
FIG. 3 illustrates a waveform diagram for serializer circuitry.

FIG. 3 illustrates waveform diagram 300 for the serializer circuitry 112 of FIG. 2. As can be seen from the waveform diagram 300, the frequency of the clock signal FClk is two times the frequency of the clock signal PllClk. Further, the inverted clock signal PllClk_IN is a delayed and inverted version of the clock signal PllClk.

At the rising edge 302 of the clock signal FClk, the data signal Data_ff0 is captured by the buffer circuitry 232. At the rising edge 304 of the clock signal FClk, the data signal Data_ff1 is captured by the buffer circuitry 234.

At the rising edge 312 of the clock signal PllClk, the multiplexer 240 selects and outputs the data signal 233 (d0<3:0>) as the signal FIFO-out<3:0>. For example, the value of the read pointer signal RdPtr<2:1> is 00, and accordingly the multiplexer 240 selects and outputs the signal (or data signal) 233 (d0<3:0>) that is associated with the input 00 as the signal FIFO-out<3:0>. Further, the signal FIFO_out_in<1:0>, which corresponds to the first two bits of the signal FIFO-out<3:0>, is output to the first input of the multiplexer 270 as the signal FIFO-out_in<0> (e.g., the first bit of the signal FIFO-out<3:0>) and to the first input of the multiplexer 272 as the signal FIFO-out_in<1> (e.g., the second bit of the signal FIFO-out<3:0>). Further at the rising edge 312 of the clock signal PllClk, the multiplexer 270 selects and outputs the signal FIFO-out_in<0> as the signal muxout0, which is captured and output by the latch circuitry 260 as the signal Ser0. At the rising edge 312 of the clock signal PllClK, the multiplexer 272 selects and outputs the signal FIFO-out_in<1> as the signal muxout1, which is captured by the buffer circuitry 254.

At the rising edge 322 of the inverted clock signal PllClk_IN, the read pointer signal RdPtr<0> transitions to a value of 1 (e.g., has a rising edge 332). Further, the third and fourth bits of the signal FIFO-out<3:0> (e.g., illustrated as signal FIFO_out_in<3:2>), are output by the buffer circuitry 250 and the buffer circuitry 252 as the signals FIFO-out_in<2> and FIFO-out_in<3>, respectively. Further, based on the rising edge 322 of the clock signal PllClk_IN and the rising edge 332 of the read pointer signal RdPtr<0>, the multiplexer 270 outputs the signal FIFO-out_in<2> (d0<2>) as the signal muxout0, and the multiplexer 272 outputs the signal FIFO-out_in<3> (d0<3>) as the signal muxout1. Based on the rising edge 322 of the clock signal PllClk_IN, the multiplexer 274 selects and outputs the signal Ser0 as the output signal Sdata.

Accordingly, at the rising edge 332 of the read pointer signal RdPtr<0>, the multiplexer 270 outputs the signal FIFO-out_in<2> as the signal muxout0, and the multiplexer 270 outputs the signal FIFO-out_in<3> as the signal muxout1. The signal muxout0 is captured by the latch circuitry 260, the signal muxout1 is captured by the buffer circuitry 254, and the buffer circuitry 254 outputs the signal FIFO-out_in<1> (e.g., the data bit d0<1> of the data signal d0<3:0>) as the signal Ser1. At the falling edge 324 of the inverted clock signal PllClk_IN, the multiplexer 274 selects and outputs the signal Ser1 (e.g., bit d0<1> of the data signal d0<3:0>) as the output signal Sdata.

At the rising edge 326 of the inverted clock signal PllClk_IN, the read pointer signal RdPtr<0> has a value of zero, and the multiplexer 240 selects and outputs the signal 235 (e.g., the data signal d1<3:0>) as the signal FIFO-out<3:0>. Further, at the rising edge 326 of the inverted clock signal PllClk_IN, the read pointer signal RdPtr<0> has a value of zero. Based on the rising edge 326 of the inverted clock signal PllClk_IN, the signal FIFO-out_in<1:0> corresponds to a first bit and second bit of the signal d1<3:0>, and is output to the first input of the multiplexer 270 and the first input of the multiplexer 272 as the signals FIFO-out_in<0> and FIFO-out_in<1>, respectively. Further, the multiplexer 270 outputs the signal FIFO-out_in<0> (e.g., d1<0>) as the signal muxout0 to the latch circuitry 260, and the multiplexer 272 outputs the signal FIFO-out_in<1> (e.g., d1<1>) as the signal muxout1 to the buffer circuitry 254. The multiplexer 274 selects and outputs the signal Ser0, which has a value of d0<2>, as the output signal Sdata based on the rising edge 326. At the falling edge 328 of the inverted clock signal PllClk_IN, the multiplexer 274 selects and outputs the signal Ser1, which has a value of d0<3>, as the output signal Sdata. Accordingly, based on the rising and falling edges 322-328 the bits of the data signal d<3:0> are serially output as the output signal Sdata.

At the rising edge of the inverted clock signal PllClk_IN subsequent to the falling edge 328, the above process is repeated to serially output the bits of the data signal d1<3: 0>, and the following data signals received by the serializer circuitry 112 of FIG. 2.

With reference to the serializer circuitry 112 of FIG. 2, the buffer circuitries 250 and 252 do not increase the latency of the circuitry as the path associated with the signal Ser0 is transparent and the first data bit (e.g., the data bit associated with the signal FIFO-out_in<0>) is output as the output signal Sdata at the first rising edge of the inverted clock signal PllClk_IN (e.g., the rising edge 322 of the inverted clock signal PllClk_IN). The first data bit is able to "flow through" the serializer before the rising edge 322 of the inverted clock signal PllClk_IN). Further, the remaining bits of a first data signal (e.g., the signal 233) are stored by the serializer circuitry at the rising edge of the inverted clock signal PllClk_IN (e.g., the rising edge 322 of the inverted clock signal PllClk_IN). As can be seen by the serializer circuitry 112 of FIG. 2, and the corresponding waveform diagram 300 of FIG. 3, at the first rising edge (e.g., the rising edge 322) of inverted clock signal PllClk_IN, a first bit of a first data signal (e.g., bit d0<0> of the data signal d0<3:0>) is serialized and output as the output signal Sdata, and the second bit of the first data signal (e.g., bit d0<1> of the data signal d0<3:0>) is output to the multiplexer 274 as the signal Ser1. Further, the third and fourth bits of the first data signal (e.g., bits d0<2> and d0<3> of the data signal d0<3:0>) are captured and output by the buffer circuitries 250 and 252 to the second inputs of the multiplexers 270 and 274, respectively. Accordingly, as the state of read pointer signal RdPtr<2:1> is ahead of the state of the write pointer signal WrPtr<1:0> (e.g., the read pointer signal RdPtr<2:1> has a value of 01, when the write pointer signal WrPtr<1:0> has a value of 00), the read address is preemptively updated allowing a first bit of a first data signal (e.g., the signal 233) to be present at the output of the serializer circuitry 1112 at the rising edge 322 of the inverted clock signal PllClk_IN.

FIG. 4 illustrates a flowchart of a method 400 for serializing a data signal by serializer circuitry (e.g., the serializer circuitry 112 of FIG. 2). At 410 of the method 400, a first data signal is received based on a write pointer signal having a first value of values and a first clock signal. For example, with reference to FIG. 2 and FIG. 3, the demultiplexer 210, the latch circuitry 222, and the buffer circuitry 232 receive and output the data signal Data<3:0> as the data signal 233 based on the write pointer signal WrPtr<1:0> having a first value (e.g., 00) and the clock signal Fclk.

At 420 of the method 400, a data signal is serialized to generate a serial signal based on a read pointer signal having a second value of the values and a second clock signal. At 420 of the method 400, the second value differs from the first value. In one example, the multiplexer 240 receives and outputs the signal 233 (e.g., data signal d0<3:0>) as the signal FIFO-out<3:0> based on the read pointer signal RdPtr<2:1> having a value of 00. In one example, the input associated with the data signal d0<3:0> is selected to be output by the multiplexer 240 before the write pointer signal WrPtr<1:0> is set to a value of 00 (e.g., the read pointer signal RdPtr<2:1> has the value of 00 before the write pointer signal WrPtr<1:0> has a value of 00>. In one example, the values of the read pointer signal RdPtr<2:1> and the write pointer signal WrPtr<1:0> differ from each other for at least a portion of a cycle of the clock signals Fclk and PllClk. For example, as the write pointer signal WrPtr<1:0> is clocked through the values 00, 01, 11, and 10 by the clock signal Fclk, the read pointer signal RdPtr<2:1> is clocked through the values the 01, 11, 10, and 00 by the clock signal PllClk. During at least a first period the values of the read pointer signal RdPtr<2:1> and the write pointer signal WrPtr<1:0> differ from each other. In one example, the values of the read pointer signal RdPtr<2:1> and the write pointer signal WrPtr<1:0> may have a same value for at least a second period. In one or more examples, when the write pointer signal WrPtr<1:0> is set to a value of 00, the latch circuitry 222 controls the buffer circuitry 232 to output a data signal (e.g., the data signal d0<3:0>) as the signal 233 to the input of the multiplexer 240 associated with value 00. The multiplexer 240 outputs the signal 233 as the signal FIFO-out<3:0>. A first bit (e.g., bit 0) is received at a first input of the multiplexer 270 as the signal FIFO-out_in<0> and output as the signal muxout0 to the latch circuitry 260. A second bit (e.g., bit 1) is received at a first input of the multiplexer 272 as the signal FIFO-out_in<1> and output as the signal muxout1 to the buffer circuitry 254. A third bit (e.g., bit 2) is received by the buffer circuitry 250, and a fourth bit (e.g., bit 3) is received by the buffer circuitry 252.

In one example, the read pointer signal and write pointer signal are reset. For example with reference to FIG. 2, the read pointer signal RdPtr<2:1> is reset to a value of 01 based on the signal AsyncReset, and the write pointer signal WrPtr<1:0> is reset to a value of 00 based on the signal SyncReset. In one example, the read pointer signal RdPtr<2: 0> is reset based on the signal AsyncReset to reset the read pointer signal RdPtr<2:1>. The read pointer signal RdPtr<2: 1> is incremented through the values 01, 11, 10, and 00 based on the rising (or falling) edges of the clock signal PllClk. The write pointer signal<1:0> is incremented through the values 00, 01, 11, and 10 based on the rising (or falling) edges of the clock signal Fclk. When the read pointer signal RdPtr<2:1> has a value of 01, the write pointer signal WrPtr<1:0> has a value of 00, when the read pointer signal RdPtr<2:1> has a value of 11, the write pointer signal WrPtr<1:0> has a value of 01, when the read pointer signal RdPtr<2:1> has a value of 10, the write pointer signal WrPtr<1:0> has a value of 11, and when the read pointer signal RdPtr<2:1> has a value of 00, the write pointer signal WrPtr<1:0> has a value of 10. Accordingly, the state of the read pointer signal RdPtr<2:1> is one state ahead of the write pointer signal WrPtr<1:0>, and data is available at the output of the multiplexer 270 before an edge of the clock signal PllClk or the inverted clock signal PllClk_IN.

In one or more examples, a first bit of a first data signal is output and the remaining bits of the first data signal are stored. For example, with reference to FIG. 2 and FIG. 3, at the rising edge 322 of the inverted clock signal PllClk_IN, the bit d0<0> of the data signal d0<3:0> (e.g., the signal Ser0) is selected and output by the multiplexer 274 as the output signal Sdata. Further at the rising edge 322 of the inverted clock signal PllClk_IN, the bit d0<1> is stored by the buffer circuitry 254, the bit d0<2> is stored by the buffer circuitry 250, and the bit d0<3> is stored by the buffer circuitry 256.

As is described above with regard to the waveform diagram 300 of FIG. 3, the data bit d0<0> is preemptively stored within the latch circuitry 260 and output to the first input of the multiplexer 274 as the signal Ser0. For example, the data bit d0<0> is available to be output by the multiplexer 274 when the rising edge 322 of the inverted clock signal PllClk_IN occurs.

In one or more examples, the remaining bits of the first data signal are output. For example at three subsequent rising edges of the inverted clock signal PllClk_IN, the subsequent bits (e.g., bits d0<1>, d0<2>, and d0<3>) of the first data signal (e.g., data signal d0<3:0>) are output as the output signal Sdata.

In one example, at the rising edge 326 of the inverted clock signal PllClk_IN, a second data signal (e.g., d1<3:0> or the signal 235) is selected and output by the multiplexer 240, and the first inputs of the multiplexers 270 and 272 receive the first and second bits of the second data signal (e.g., d1<0> and d1<1>) as the signals FIFO-out_in<0> and FIFO-out_in<1>. Further, the third and fourth bits of the second data signal (e.g., d1<2> and d1<3>) are stored by the buffer circuitries 250 and 252. Accordingly, at the rising edge of the inverted clock signal PllClk_IN that occurs after the rising edge 328 when the final bit of the first data signal (e.g., the bit d0<3> of the data signal d0<3:0>) is output as the output signal Sdata.

The IC device described in the above includes a communication system having serializer circuitry that combines buffer circuitry with the serializer circuitry to mitigate the latency of the serializer circuitry. The serializer circuitry described in the above uses a read pointer signal that is unaligned with a write pointer signal, where the states of a read pointer signal and a write pointer signal differ from each other. Using a read pointer signal that is aligned with the write pointer signal allows for a read capture to be performed on a single edge of a clock signal of the serializer circuitry. When the read pointer signal begins to switch between values, a first bit is output from the serializer circuitry as the read pointer signal is a state ahead of the write pointer signal. Further, the remaining bits of the data signal are stored an output at subsequent edges of the clock signal of the serializer circuitry. Accordingly, as the first data bit is output at the first edge of the clock signal of the serializer circuitry, the latency of the serializer circuitry is reduced, improving the performance of the corresponding SerDes communication system.

While the foregoing is directed to specific examples, other and further examples may be devised without departing from the basic scope thereof, and the scope thereof is determined by the claims that follow.

What is claimed is:

1. A serializer circuitry comprising:
data input circuitry configured to receive and output a first data signal based on a write pointer signal having a first value of values and a first clock signal; and
data serializer circuitry configured to serialize the first data signal to generate a serial signal based on a read pointer signal having a second value of the values and a second clock signal, wherein generating the serial signal comprises outputting a first bit based on an inverted second clock signal and storing a second bit of the first data signal based on the second clock signal, and wherein the first value differs from the second value.

2. The serializer circuitry of claim 1, wherein generating the serial signal comprises outputting the first bit of the first data signal based on a rising edge of the inverted second clock signal and storing the second bit of the first data signal based on a rising edge of the second clock signal.

3. The serializer circuitry of claim 1, wherein the write pointer signal is cycled through the values based on the first clock signal and the read pointer signal is cycled through the values based on the second clock signal, and wherein the write pointer signal and the read pointer signal are reset to different ones of the values.

4. The serializer circuitry of claim 1, wherein the data serializer circuitry comprises: a first multiplexer configured to select and output the first data signal based on the read pointer signal;
first buffer circuitry coupled to an output of the first multiplexer and configured to receive a third bit of the first data signal; and
a second multiplexer comprising:
a first input coupled to the output of the first multiplexer and configured to receive the first bit of the first data signal; and
a second input coupled to an output of the first buffer circuitry and configured to receive the third bit of the first data signal from the first buffer circuitry, and wherein the second multiplexer is configured to select and output the first bit of the first data signal based on the read pointer signal.

5. The serializer circuitry of claim 4, wherein the data serializer circuitry further comprises:
second buffer circuitry coupled to the output of the first multiplexer and configured to receive a fourth bit of the first data signal;
a third multiplexer comprising:
a first input coupled to the output of the first multiplexer and configured to receive the second bit of the first data signal; and
a second input coupled to an output of the second buffer circuitry and configured to receive the fourth bit of the first data signal from the second buffer circuitry, and wherein the third multiplexer is configured to select and output the second bit of the first data signal based on the read pointer signal.

6. The serializer circuitry of claim 5, wherein the data serializer circuitry further comprises:
first latch circuitry coupled to an output of the second multiplexer and configured to capture and output a first serial signal based on the inverted second clock signal; and
third buffer circuitry coupled to an output of the third multiplexer and configured to capture and output a second serial signal based on the inverted second clock signal.

7. The serializer circuitry of claim 6, wherein the data serializer circuitry further comprises:
a fourth multiplexer comprising:
a first input coupled to an output of the first latch circuitry; and
a second output coupled to an output of the third buffer circuitry, wherein the fourth multiplexer is configured to output one of the first serial signal and the second serial signal as a serial output signal based on the inverted second clock signal.

8. The serializer circuitry of claim 7, wherein the second multiplexer is configured to select and output the third bit of the first data signal based on the read pointer signal, and the third multiplexer is configured to select and output the fourth bit of the first data signal based on the read pointer signal.

9. The serializer circuitry of claim 7 further comprising:
fourth buffer circuitry coupled to a first input of the first multiplexer and configured to receive the first data signal and output the first data signal based on the write pointer signal.

10. A communication system comprising:

transmitter circuitry configured to receive a data signal and output a serial data signal, the transmitter circuitry comprising:

serializer circuitry comprising:

data input circuitry configured to receive and output a first data signal based on a write pointer signal having a first value of values and a first clock signal; and data serializer circuitry configured to serialize the first data signal to generate a serial signal based on a read pointer signal having a second value of the values and a second clock signal, wherein generating the serial signal comprises outputting a first bit based on an inverted second clock signal and storing a second bit of the first data signal based on the second clock signal, and wherein the first value differs from the second value; and receiver circuitry configured to receive the serial data signal from the transmitter circuitry.

11. The communication system of claim 10, wherein generating the serial data signal comprises outputting the first bit of the first data signal based on a rising edge of the inverted second clock signal and storing the second bit of the first data signal based on a rising edge of the second clock signal.

12. The communication system of claim 10, wherein the write pointer signal is cycled through the values based on the first clock signal and the read pointer signal is cycled through the values based on the second clock signal, and wherein the write pointer signal and the read pointer signal are reset to different ones of the values.

13. The communication system of claim 10, wherein the data serializer circuitry comprises:

a first multiplexer configured to select and output the data signal;

first buffer circuitry coupled to an output of the first multiplexer and configured to receive a third bit of the data signal; and a second multiplexer comprising:

a first input coupled to the output of the first multiplexer and configured to receive the first bit of the data signal; and a second input coupled to an output of the first buffer circuitry and configured to receive the third bit of the data signal from the first buffer circuitry, and wherein the second multiplexer is configured to select and output the first bit of the data signal based the read pointer signal.

14. The communication system of claim 13, wherein the data serializer circuitry further comprises:

second buffer circuitry coupled to the output of the first multiplexer and configured to receive a fourth bit of the data signal;

a third multiplexer comprising:

a first input coupled to the output of the first multiplexer and configured to receive the second bit of the data signal; and a second input coupled to an output of the second buffer circuitry and configured to receive the fourth bit of the data signal from the second buffer circuitry, and wherein the third multiplexer is configured to select and output the second bit of the data signal based on the read pointer signal.

15. The communication system of claim 14, wherein the data serializer circuitry further comprises:

first latch circuitry coupled to an output of the second multiplexer and configured to capture and output a first serial signal based on the inverted second clock signal; and third buffer circuitry coupled to an output of the third multiplexer and configured to capture and output a second serial signal based on the inverted second clock signal.

16. The communication system of claim 15, wherein the data serializer circuitry further comprises:

a fourth multiplexer comprising:

a first input coupled to an output of the first latch circuitry; and a second output coupled to an output of the third buffer circuitry, wherein the fourth multiplexer is configured to output one of the first serial signal and the second serial signal as a serial output signal based on the inverted second clock signal.

17. A method comprising:

receiving, at serializer circuitry, a data signal based on a write pointer signal having a first value of values and a first clock signal; and serializing, via the serializer circuitry, the data signal to generate a serial signal based on a read pointer signal having a second value of the values and a second clock signal, wherein generating the serial signal comprises outputting a first bit based on an inverted second clock signal and storing a second bit of the data signal based on the second clock signal, and wherein the first value differs from the second value.

18. The method of claim 17, wherein generating the serial signal comprises outputting the first bit of the data signal based on a rising edge of the inverted second clock signal and storing the second bit of the data signal based on a rising edge of the second clock signal.

19. The method of claim 17, wherein the write pointer signal is cycled through the values based on the first clock signal and the read pointer signal is cycled through the values based on the second clock signal, and wherein the write pointer signal and the read pointer signal are reset to different ones of the values.

20. The method of claim 17 further comprising:

outputting, from first multiplexer circuitry of the serializer circuitry, the data signal based the read pointer signal;

outputting, from the serializer circuitry, the first bit of the data signal and storing the second bit of the data signal based on a first rising edge of the inverted second clock signal and the read pointer signal; and outputting, from the serializer circuitry, the second bit of the data signal based on a second rising edge of the inverted second clock signal and the read pointer signal.

* * * * *